Aug. 14, 1928. 1,680,348

G. THILO

MEANS FOR REGULATING GRID VOLTAGE OF ELECTRON TUBES

Filed Dec. 24, 1924

INVENTOR
Gunther Thilo
BY
Van Deventer & Nickel
ATTORNEYS

Patented Aug. 14, 1928.

1,680,348

UNITED STATES PATENT OFFICE.

GÜNTHER THILO, OF FRIEDENAU, NEAR BERLIN, GERMANY, ASSIGNOR TO RADIO PATENTS CORPORATION, OF NEW YORK, N. Y., A CORPORATION OF NEW YORK.

MEANS FOR REGULATING GRID VOLTAGE OF ELECTRON TUBES.

Application filed December 24, 1924, Serial No. 757,886, and in Germany January 6, 1923.

The invention relates to apparatus for regulating the grid potential in tubes containing three or more electrodes, and has for its object the attainment of great sensitivity and of easy adjustment of the controlling means.

To this end, a cell whose resistance varies with the degree of its illumination, is connected with the grid in branched-circuit manner. By varying the illumination of this cell, the grid voltage can be varied within wide limits. This arrangement is also extraordinarily sensitive and permits variations of very slight degree. Besides, the arrangement can very easily be constructed and the variation of the intensity of the light readily accomplished. In the branched-circuit a light-sensitive resistance or a vacuum discharge tube can be used as an additional resistance. Preferably the voltage for the governing tubes, as well as for the branch circuit should be derived from one potentiometer.

Figure 1:
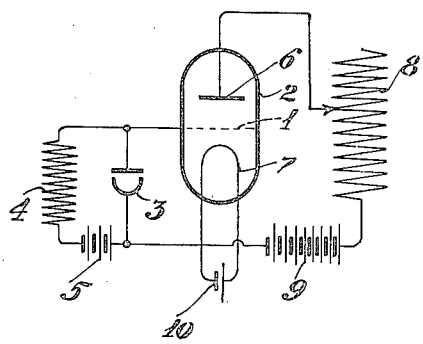
Figure 2:
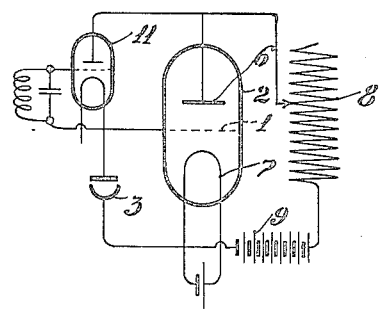
Figure 3:
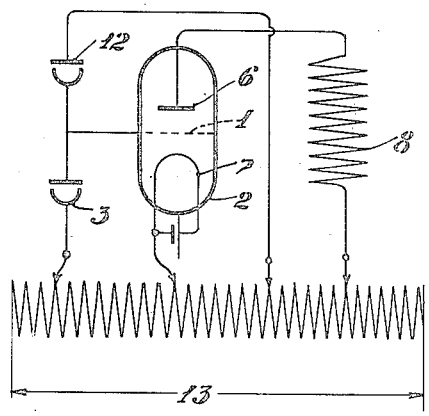

The drawings, Figures 1–3 show diagrammatically the connections of the invention, and its various modifications.

In Figure 1, a light sensitive cell 3, in divided potential connection, is attached to the grid 1 of tube 2. The second resistance of this potential circuit can be any suitable resistance 4, which is in series with the cell 3 and battery 5. The anode circuit of the tube passes from the anode 6 to the hot filament 7, through a battery 9, and a suitable adjustable resistance 8. Filament 7 is heated in the usual way by a battery 10. Cell 3 is illuminated by a source of illumination not shown, whose intensity can be varied by suitable means, for example by diaphragm or the like.

Suppose the resistance 4 and the light-electric cell 3 have accurately the same ohmic resistance, in this case, as the two resistances are each on one of the poles of the battery, the point opposite the battery at which the branch currents unite would have the voltage 0. The grid of the tube has consequently a preliminary voltage 0. If the photo electric cell 3 is now exposed to light its resistance drops and the voltage of the battery pole appertaining to it, in this case the negative pole, will predominate on the point of junction and consequently also on the grid. It is therefore evident that the ratio of resistance will have to be arranged so that also by lesser exposure of the cell a positive preliminary voltage is produced. As it is possible to regulate the intensity of exposure in very fine degree and also continuously, a very good means is provided to adjust the preliminary voltage of the grid to any desired degree.

Both resistances 3 and 4 can naturally be interchanged and cell 3 put in place of resistance 4, or the reverse.

Fig. 2 shows a modification of the invention in which a vacuum discharge tube is used as a second resistance.

The arrangement shows at the same time how the use of the separate battery 5 of Fig. 1 may be avoided by the use of the anode battery 9. The reference numerals 1 to 10 correspond to the several parts of Figs. 1, 4 and 5 being however omitted and the discharge vessel 11 being substituted for the resistance 4. The photo electric cell 3 is situated, as can be seen, in the lead from the negative pole of the anode battery. The lead is preferably branched from the connection point of the battery on the cathode. The positive pole leads over the useful resistance of the anode and thence across the discharge vessel 11. The two leads join in the leading in lead for the grid 1. It is evident that now the same conditions must exist as in the arrangement Fig. 2. At exposure to light of cell 3 the resistance of the same decreases, and the negative voltage of the anode-battery pole of the lead is superior to the positive voltage of the other battery pole laid across the discharge vessel, and inversely. The use of the discharge vessel 11 instead of the resistance 4 (Fig. 1) presents the advantage of a more simple and nevertheless much finer adjustment. The resistance of a discharge vessel depends, as is generally known, on the cathode temperature and on the preliminary voltage of the controlling grid. It is therefore possible to regulate the desired resistance of the tube by varying the heating current or by varying the preliminary voltage of the grid of vessel 11.

In the circuit of Figure 3, the two resistances of the divided potential connection are represented by the two light sensitive cells 3 and 12. Voltage for the tube and for the divided potential circuit is in this form derived from a potentiometer 13, to which the individual leads of the cell 3, to the filament, to cell 12, and to anode 6 are adjustably attached. By adjustment of these leads on the potentiometer, the individual potentials can be applied in a proper manner. Cell 3 is also caused by the varying light to regulate the grid voltage; also cell 12, or both 3 and 12 can be simultaneously illuminated. The new connection can thus be used for relay purposes, for instance, any suitable relay may be connected into the anode circuit, which thus is controlled by the action of the light acting upon the light sensitive cell.

Having described my invention, what I believe to be new and desire to secure and protect by Letters Patent of the United States is:—

1. Means for regulating the grid voltage of a thermionic tube having three or more electrodes, input and output circuits interlinking said electrodes, a plurality of light sensitive elements, one of said elements being included in series with said input circuit and the other of said elements being included in series with a portion of said output circuit and means for varying the illumination of said light sensitive elements to alter the resistance thereof.

2. Means for regulating the grid voltage of a thermionic tube having three or more electrodes, said means comprising a circuit having included therein a light sensitive element and a variable resistance device and a second variable resistance device connected to the grid of said tube and a potentiometer to which said grid, light sensitive element and variable resistance are connected.

3. A light controlled system comprising an electron tube having grid, filament and plate electrodes, a potentiometer, connections extending from each of said electrodes to selected points on said potentiometer, a light sensitive cell disposed in the connection from said grid electrode to said potentiometer, and an auxiliary circuit including a light sensitive cell connected between said grid electrode and a selected point on said potentiometer, whereby said light sensitive cells by their conjoint action control the operation of said circuits.

4. A light controlled system comprising an electron tube having grid, filament and plate electrodes, input and output circuits interconnecting said electrodes, a light sensitive cell disposed in said input circuit, and a connection including a variable resistance extending from said grid electrode to a point in said output circuit, said light sensitive cell and said variable resistance operating by their conjoint action to control the operation of said circuits.

5. Apparatus for amplifying electric current comprising a thermionic device, having a cathode, anode and a grid, a potentiometer arranged for connection to a supply circuit, and connections between said device and said potentiometer, said connections including light-sensitive cells in series joined to different points on said potentiometer and a connection between said grid electrode and a point between said cells.

Signed at Berlin, Germany, this 29th day of November, A. D. 1924.

GÜNTHER THILO.